United States Patent Office 3,178,984
Patented Apr. 20, 1965

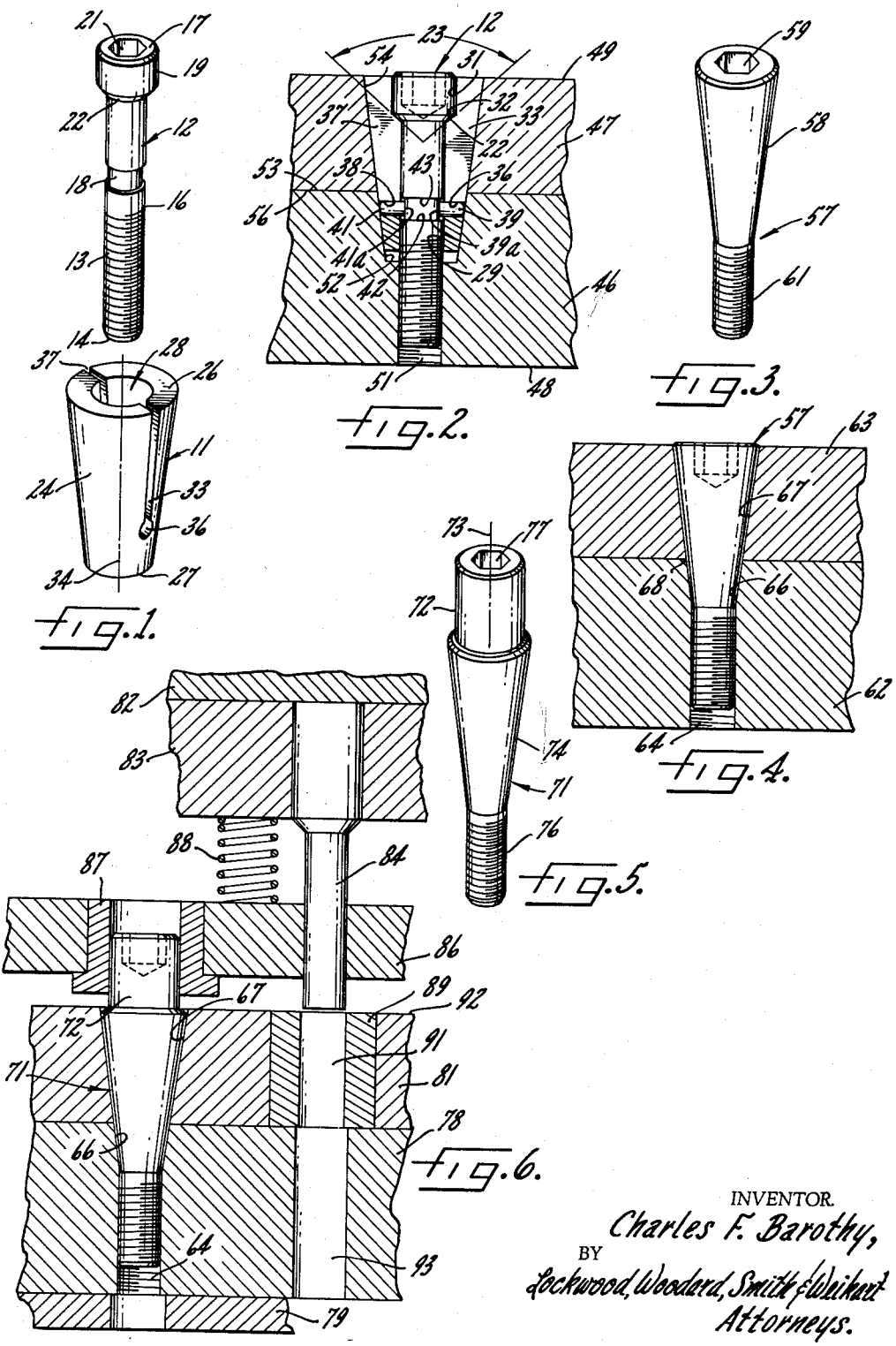

3,178,984
SCREW DOWEL
Charles F. Barothy, 1140 Ivy Lane, Indianapolis, Ind.
Filed Feb. 1, 1963, Ser. No. 255,505
3 Claims. (Cl. 83—637)

This invention relates generally to tooling and more particularly to novel means for locating and securing together die sections or the like.

In metal stamping operations, for example, it is common practice to employ a die set which is mounted in a press. The die set typically includes a die holder or shoe and a die block. It is common practice to employ a pair of dowel pins fitted into apertures in the die shoe and die block to properly position the die block with respect to the punch. In addition to this, socket screws are used to secure the die block and die shoe together thereby preventing separation of these two die sections as could otherwise occur if they are pulled apart in a direction parallel to the axes of the dowel pins.

In manufacturing operations, it is desirable to occasionally remove the die block from the die shoe for servicing thereof. Where the conventional screws and dowels are used, it is usually necessary to remove the entire die set from the press for servicing. However, this is undesirable inasmuch as it requires considerable time and effort to do so. Naturally, the replacement of a die set in the press also requires considerable time and effort.

It is a general object of the present invention to provide improved means for securing together sections of die sets for high production activity. A further object is to provide means facilitating the quick removal of die sections from die sets without necessitating removal of the die set from a press.

A further object is to provide means for achieving the foregoing objects and well suited to a guiding function in press operation.

Described briefly, a typical embodiment of the present invention comprises a die shoe having a threaded aperture therein, the threaded aperture extending partially through the thickness of the die shoe and opening into an outwardly tapering conical aperture which is coaxial with the threaded aperture and opens into the upper face of the die shoe. A die block is mounted to the die shoe and has a conical aperture therethrough whose diameter at the mating surfaces of the die block and die shoe is the same as that of the conical aperture in the die shoe at the mating surface. The screw dowel has a conical exterior surface engaging the conical aperture wall in both the die shoe and the die block and has an external thread thereon threadedly engaged with the threads in the die shoe. Means are provided in the upper end of the dowel screw for receiving a turning tool so that the dowel screw may be drawn tightly into engagement of its conical exterior surface with the conical aperture of the die block and die shoe.

The full nature of the invention will be understood from the accompanying drawings and the following description and claims.

FIG. 1 is an exploded perspective view of a screw dowel according to a typical embodiment of this invention.

FIG. 2 is an elevational view in cross-section showing the incorporation of the screw dowel of FIG. 1 in a die set.

FIG. 3 is a perspective view of a second embodiment of this invention.

FIG. 4 is an elevational view showing in cross-section a die set incorporating the screw dowel of FIG. 3 according to the present invention.

FIG. 5 is a perspective view of a third embodiment of a screw dowel according to the present invention.

FIG. 6 is an elevational view in cross-section showing the incorporation of FIG. 5 in a die set according to the present invention.

Referring particularly to FIGS. 1 and 2, the screw dowel incorporates two members, 11 and 12. Member 12 is generally in the form of a screw having external screw threads 13 extending from the lower end 14 to a point 16 approximately half way between the lower end 14 and the upper end 17. A circumferential groove 18 is provided above the screw threaded. A head portion 19 includes a hexagonal socket 21. The socket 21 is adapted to receive an Allen wrench (not shown). Between the head 19 and the body of the member 12, a conical shoulder 22 is provided. A typical vortex angle 23 of the cone is 82° though other angles may be found to be satisfactory.

The member 11 has a conical exterior surface 24 and has parallel top and bottom surfaces 26 and 27 respectively. Member 11 has an aperture 28 therethrough having a stepped wall. The lower wall 29 is cylindrical as is the upper wall 31. The step 32 extending between the lower and upper walls is conical having the same included angle as the shoulder 22 of the member 12.

An elongate slot 33 extends lengthwise of the member 11 and parallel to the axis 34 thereof. A circular aperture 36 is provided at the lower end of the slot 33 and is of a somewhat larger diameter than the width of the slot. An identical slot 37 and aperture 38 are provided in the member 11 diametrically opposite the slot and aperture 33 and 36 respectively. The diameters of the wall 29 and wall 31 of the member 11 are slightly greater than the diameter of the body of member 12 and the head 19 thereof. Member 12 can therefore be inserted into the aperture 28 and turned freely therein.

A pin 39 is provided in the aperture 36 and pin 41 may be provided in aperture 38. The inner ends 39a and 41a of the pins 39 and 41 extend into the groove 18. The height of the groove 18 between the shoulders 42 and 43 thereof is somewhat greater than the diameter of the pin. In a typical example, where the pin diameter is ⅛ inch, the height of the groove may be ³⁄₁₆ inch. Therefore, the pins are effective to engage the shoulder 42 during withdrawal of the screw member 12 from the die assembly, thereby effecting the withdrawal of the conical member 11 as well. Yet because the groove is wider than the diameter of the pins, the pulling of the member 11 into the die assembly by the turning of the member 12 during installation is effected by the engagement of the conical surface 22 of member 12 with the conical surface 32 of member 11. This is achieved before and without any engagement at all of the pins 39 and 41 with the upper shoulder 43 of the groove.

Referring further to FIG. 2, the die set illustrated fragmentarily includes a first part 46 and a second part 47. Normally in a die set the part 46 is the die set base or die shoe and the part 47 is the die block. These two sections of the die are removable from a press if desired, but is normally preferable to keep the base 46 in the press and merely remove the block 47 for maintenance or rework thereof. The lower surface 48 of the base 46 normally rests on a press or stamping machine. The upper surface 49 of the block 47 may be provided with protrusions and hollows of whatever form is desired for the manufacture of the part for which the die is intended. Also, apertures may be provided through both the upper and lower sections 47 and 46 respectively if desired for punching operations.

The part 46 is provided with an internally threaded aperture 51 and with a conical aperture or recess 52 at the top thereof. While the threaded aperture opens into the bottom face 48 of the part 46, it is the conical wall 52 which opens into the upper surface 53 of the part 46. A conical aperture is also provided in the part 47 and the conical wall thereof 54 opens into the lower face 56 of part 47 and also into the upper face 49 thereof. The diameters of the conical wall 54 and the conical wall 52 of parts 47 and 46 respectively are equal at their junction with the mating surfaces 53 and 56 of parts 46 and 47 respectively. It will be apparent therefore, that if the vortex angles of the conical surface 24 member 11 and of the conical walls 52 and 54 is made equal, the axis of each of the walls can be made colinear with the axis of the conical surface 24 of member 11 upon turning the screw member 12 into the part 46. A typical vortex angle is 15°, but other angles may be found suitable.

From the foregoing description it can be appreciated that the present invention is effective to provide a securely and accurately assembled die set. The provision of the grooves 33 permits not only the aligning function as the member 11 is drawn into the conical apertures but also permits an even tighter wedging action once perfect alignment has been attained and wedging action between the surface 24 and the surfaces 52 and 54 has been initiated. Yet the provision of the pins 39 and groove 18 facilitates withdrawal of the member 11 whenever it is desirable to remove section 47 from the set for servicing. Section 46 can remain mounted in the press. Two screw dowels according to the present invention will hold a die section down in place more securely than four screws and two conventional dowels of the same size.

In the embodiment illustrated in FIGS. 3 and 4, a solid screw dowel is provided. In this embodiment the screw dowel includes the threaded portion, conical portion, and tool receiving portion all in a single integral unit 57. The conical portion 58 has the same included angle or vortex angle as in the previously described embodiment. The tool receiving portion may be a hexagonal socket 59, if desired though other configurations may also be employed. The external threads 61 may be identical to those in the previous embodiment. In this version, the lower and upper die parts 62 and 63 respectively again have conical apertures therein. In the part 62 a threaded aperture 64 is provided with the conical wall 66 extending outwardly therefrom. Again the conical wall 67 in the part 63 is of the same diameter as the wall 66 around the circle 68 where the upper and lower faces of parts 62 and 63 meet. Referring to FIGS. 5 and 6 a still further embodiment of the present invention is illustrated. Again, as in the embodiment illustrated in FIG. 3, the threaded portion, conical portion, and the tool receiving portion are all incorporated in one integral unit 71. However, a cylindrical exterior surface 72 having an axis 73 colinear with the axis of the conical surface 74 and with the axis of the threaded portion 76, and with the axis of the hexagonal socket 77 is provided at the end opposite the threaded portion. This surface is intended to function as a guide as will become apparent on consideration of FIG. 6.

FIG. 6, the die set base 78 can be considered mounted to a machine base 79 which can be the frame of a press, for example. The die block 81 is secured to the die shoe 78 by means of the dowel screw 71 in the same manner as previously described with reference to FIG. 4. The conical wall 67 and the conical wall 66 and the aperture 64 can all be of the same dimensions exactly as those in FIG. 4 and are therefore given the same reference numerals. However, additional portions of the press are shown and most of these fragmentarily. They include a punch holder 82, punch retainer 83, perforator or punch 84, stripper 86, guide bushing 87, and a spring 88. It should be understood that all of these parts are reciprocable with respect to the frame 79 of the press. Naturally, therefore, they are reciprocable with respect to the die set including sections 78 and 81 which are secured to the press. A die bushing 89 is provided in the die shoe 81 and has an aperture 91 therethrough accommodating passage of the perforator 84 and also of material punched from the stock (not shown) fed into the press and resting on the upper surface 92 of the die block 81 when the punch 84 is caused to descend. The aperture 93 in the die shoe 78 permits punched out stock to fall through.

The guide bushing 87, secured to the stripper 86, is sized to fit the cylindrical surface 72 of the screw dowel whereby the dowel serves to guide the stripper and to locate the stripper. The stripper and punch are precisely fitted together so that when the stripper is precisely located by the upper end of the screw dowel, the punch is precisely located on the axis of the die bushing 89. Thus the guide pin provided by the screw dowel in the die set acts as a liner pin in the die set guiding the punch section accurately in the die. It is seen that this embodiment of the invention is effective to hold the die shoe and die block accurately and securely in assembly and also to locate the punch and guide the punch into the die.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A screw dowel comprising: A first frusto-conical member having a central aperture with a stepped wall, said first member having a first slot in one wall extending a substantial portion of the length of said first member, and said member having a second slot therein at a location diametrically opposite said first slot, one of said slots having a pin therein extending inwardly; and a second member disposed in said central aperture and having a threaded portion projecting from said first member, said second member having a circumferential groove therein with the said pin extending into said groove to maintain the relative axial positions of said first and second members within predetermined limits.

2. A combination comprising:
   a first internally-threaded part having a conical recess therein;
   a second part having a conical aperture therein;
   a screw dowel including first and second units, said first unit having a conical exterior surface and a second unit having an externally-threaded portion thereon and said second unit having a tool-receiving portion, said first and second units having a common axis, and said screw dowel including means on said units to limit axial movement of said first unit with respect to said second unit,
   the externally-threaded portion of said second unit being threadedly engaged with the internal threads of said first part, thereby securing said first and second parts and said screw dowel together in assembly, said conical exterior surface being in forced wedging engagement with said conical recess and conical aperture of said first and second parts, respectively, said forced engagement causing said screw dowel to be tight in said first and second parts and aligning said conical recess with said conical aperture.

3. A combination comprising:
   a machine base;
   a die holder mounted on top of said base and having a first aperture therein with a first conical wall, said wall decreasing in diameter at greater distances from the top of said die holder;
   a die block on said die holder and having a second aperture therein with a second conical wall, said second wall decreasing in diameter at greater distances from the top of said die block;
   a die bushing in said die block;

a dowel securing said die block to said die holder, said dowel having a tapered body and a screw thread thereon, said body being immovable relative to said screw thread, said screw thread being threadedly received in said die holder and holding said tapered body in wedging engagement with both of said walls whereby said tapered body establishes and maintains a colinear relationship of the axis of said first wall and the axis of said second wall, and said dowel having a guiding head thereon;

a reciprocable punch;

a punch guide member engaging said punch, said guide member having a guide bushing therein, said guide bushing being guidingly engaged by the guiding head of said dowel to align said punch with said die bushing.

References Cited by the Examiner

UNITED STATES PATENTS

| | | | |
|---|---|---|---|
| 1,944,380 | 1/34 | Vance | 29—512 |
| 2,379,271 | 6/45 | Bechtel | 83—698 X |
| 2,517,668 | 8/50 | Howald | 85—9 X |
| 2,635,338 | 4/53 | Dallenback | 32—5 |
| 2,652,297 | 9/53 | Stearns et al. | |
| 2,801,696 | 8/57 | Banko | 83—690 X |
| 2,825,258 | 3/58 | McCabe et al. | 85—24 |

FOREIGN PATENTS

| | | |
|---|---|---|
| 85,455 | 2/96 | Germany. |
| 408,643 | 1/25 | Germany. |

ANDREW R. JUHASZ, *Primary Examiner.*
WILLIAM W. DYER, JR., *Examiner.*